United States Patent
Gharavi-Alkhansari et al.

(10) Patent No.: US 8,774,541 B2
(45) Date of Patent: Jul. 8, 2014

(54) INTRA PREDICTION WITH ADAPTIVE INTERPOLATION FILTERING FOR IMAGE COMPRESSION

(75) Inventors: Mohammad Gharavi-Alkhansari, Santa Clara, CA (US); Ali Tabatabai, Cupertino, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1267 days.

(21) Appl. No.: 12/265,653

(22) Filed: Nov. 5, 2008

(65) Prior Publication Data

US 2010/0111431 A1 May 6, 2010

(51) Int. Cl.
*G06K 9/36* (2006.01)
*G06K 9/46* (2006.01)

(52) U.S. Cl.
USPC .......................................................... 382/238

(58) Field of Classification Search
CPC .............. H04N 19/00; H04N 19/0006; H04N 19/00066; H04N 19/00018; H04N 19/0078; H04N 19/00157; H04N 19/00012; H04N 19/00048
USPC ......... 382/236, 238, 239; 375/240.12, 240.13
See application file for complete search history.

(56) References Cited

U.S. PATENT DOCUMENTS

| | | | |
|---|---|---|---|
| 5,387,938 A * | 2/1995 | Fukuda et al. ............ 375/240.24 |
| 6,259,734 B1 * | 7/2001 | Boon ............................. 375/240 |
| 6,341,144 B1 * | 1/2002 | Haskell et al. .............. 375/240.2 |
| 6,532,306 B1 * | 3/2003 | Boon et al. .................... 382/232 |
| 6,697,430 B1 * | 2/2004 | Yasunari et al. ......... 375/240.13 |
| 6,728,317 B1 | 4/2004 | Demos |
| 7,010,044 B2 * | 3/2006 | Dattani et al. ............ 375/240.24 |
| 7,499,492 B1 * | 3/2009 | Ameres et al. ............ 375/240.12 |
| 7,706,443 B2 * | 4/2010 | Chandramouly et al. ......................... 375/240.12 |
| 7,876,833 B2 * | 1/2011 | Segall et al. ............. 375/240.24 |
| 2002/0027955 A1 * | 3/2002 | Boon ......................... 375/240.25 |
| 2004/0062307 A1 * | 4/2004 | Hallapuro et al. ........ 375/240.13 |
| 2006/0067403 A1 * | 3/2006 | Sakai ........................ 375/240.12 |
| 2006/0072676 A1 * | 4/2006 | Gomila ..................... 375/240.27 |
| 2006/0203916 A1 | 9/2006 | Chandramouly et al. |
| 2006/0268991 A1 | 11/2006 | Segall et al. |
| 2007/0230578 A1 | 10/2007 | Shi et al. |
| 2009/0257668 A1 * | 10/2009 | Ye et al. ......................... 382/233 |
| 2013/0279578 A1 * | 10/2013 | Moriya et al. ............ 375/240.12 |

FOREIGN PATENT DOCUMENTS

| | | |
|---|---|---|
| EP | 1841230 A1 | 10/2007 |
| EP | 1841235 A1 | 10/2007 |
| WO | 02100112 A1 | 12/2002 |
| WO | 2007139839 A2 | 12/2007 |

OTHER PUBLICATIONS

Jin, Genhua et al., "An Efficient Pipelined Architecture for H.264/AVC Intra Frame Processing," IEEE International Symposium on Circuits and Systems, 2007, May 27-30, 2007, pp. 1605-1608.

* cited by examiner

*Primary Examiner* — Samir Ahmed
(74) *Attorney, Agent, or Firm* — Moser Taboada (57) ABSTRACT

A method and apparatus for adaptive interpolation filtering for image compression is disclosed. The method includes determining an activity measure associated with a set of pixels neighboring a pixel undergoing intraframe prediction or a distance measure between at least one pixel in the set of pixels and the pixel undergoing intraframe prediction, and selecting a filter for filtering at least a portion of the set of pixels in accordance with the at least one of the activity measure or the distance measure.

20 Claims, 4 Drawing Sheets

INTRA PREDICTION WITH ADAPTIVE INTERPOLATION FILTERING FOR IMAGE COMPRESSION

BACKGROUND

1. Field

The following generally relates to image compression, and more particularly, to a method, apparatus and computer-readable medium for performing adaptive interpolation filtering for image compression.

2. Related Art

In accordance with today's expanding video image applications, encoding and decoding technologies for video image processing are playing a vital role. Currently, various international standards, such as MPEG-x and H.26x, exist for providing video image compression techniques (also called "coding"). Such compression techniques are generally directed to compressing the video image for transmission and/or storage through a process of removing redundancy from the data.

The most recent international standard for video image compression is Motion Pictures Group ("MPEG") 4 or Advanced Video Coding ("AVC"). In the AVC standard, an intraframe, or I-frame, of a video image is encoded (e.g., compressed) in an encoder or decoded (e.g., uncompressed) in a decoder independently of previous or next frames in the sequence, using only information in the current frame.

In intraframe compression, the image frame is partitioned into blocks of pixels (each an "un-encoded block"). Each un-encoded block is predicted using pixels from a previously coded portion of the frame that are neighbors to such un-encoded block that have been reconstructed ("reconstructed pixels").

The AVC standard defines 9 intra prediction modes for predicting the 4×4 luma blocks, 9 prediction modes for predicting 8×8 luma blocks, 4 prediction modes for predicting 16×16 luma blocks, and 4 prediction modes for predicting 8×8 chroma blocks; these modes apply a set of defined filters to specific neighboring reconstructed pixels to obtain a prediction of the block ("predicted block"). Generally, the encoder makes multiple block predictions using multiples of the intra prediction modes, and then selects from the multiple block predictions the best mode for carrying out the prediction. To facilitate selecting the best mode, the encoder selects the best mode by calculating differences, or residuals, between the predicted block and the un-encoded block. Thereafter, the encoder selects the best mode as the mode that results in the predicted block having the least amount of residuals. The encoder signals the best mode to the decoder within the transmitted bit stream so that the decoder can decode the predicted block.

For each of the nine intra prediction modes, the encoder dutifully employs statically-formed filters defined by such intra prediction mode. These filters unfortunately do not adapt in accordance with randomness among the neighboring reconstructed pixels used in the prediction. For images with a large variance among the neighboring reconstructed pixels, this can result in a poor image compression, requiring a large number of bits to represent the compressed image and resulting in poor reconstructed image quality.

SUMMARY

Embodiments of the present invention comprise a method and apparatus for adaptive interpolation filtering for image compression. In one embodiment, a method for adaptive interpolation filtering for image compression is disclosed. The method comprises determining at least one of an activity measure associated with a set of pixels neighboring a pixel undergoing intraframe prediction or a distance measure between at least one pixel in the set of pixels and the pixel undergoing intraframe prediction, and selecting a filter for filtering at least a portion of the set of pixels in accordance with the at least one of the activity measure or the distance measure.

BRIEF DESCRIPTION OF THE DRAWINGS

So the manner in which the above recited features are attained and can be understood in detail, a more detailed description is described below with reference to Figures illustrated in the appended drawings.

The Figures in the appended drawings, like the detailed description, are examples. As such, the Figures and the detailed description are not to be considered limiting, and other equally effective examples are possible and likely. Furthermore, like reference numerals in the Figures indicate like elements, and wherein.

DETAILED DESCRIPTION

In the following detailed description, numerous specific details are set forth in order to provide a thorough understanding of exemplary embodiments or other examples described herein. However, it will be understood that these embodiments and examples may be practiced without the specific details. In other instances, well-known methods, procedures, components and circuits have not been described in detail, so as not to obscure the following description. Further, the embodiments disclosed are for exemplary purposes only and other embodiments may be employed in lieu of or in combination with of the embodiments disclosed.

As summarized above and described in more detail below, the method, apparatus and computer-readable medium for performing adaptive interpolation filtering for image compression, which can be deployed in, for example, a device for carrying out compression and/or decompression ("CODEC") for digital images (hereinafter "video codec"), is provided. Alternatively, the method, apparatus and computer-readable medium can be deployed in the video codec having one or more programmable and/or hard-coded functions, instructions, commands, directions, code and/or control data (collectively, "directives") for performing adaptive interpolation filtering for image compression, which may be executed by a device for executing the video codec.

Example System Architecture

Figure 1:
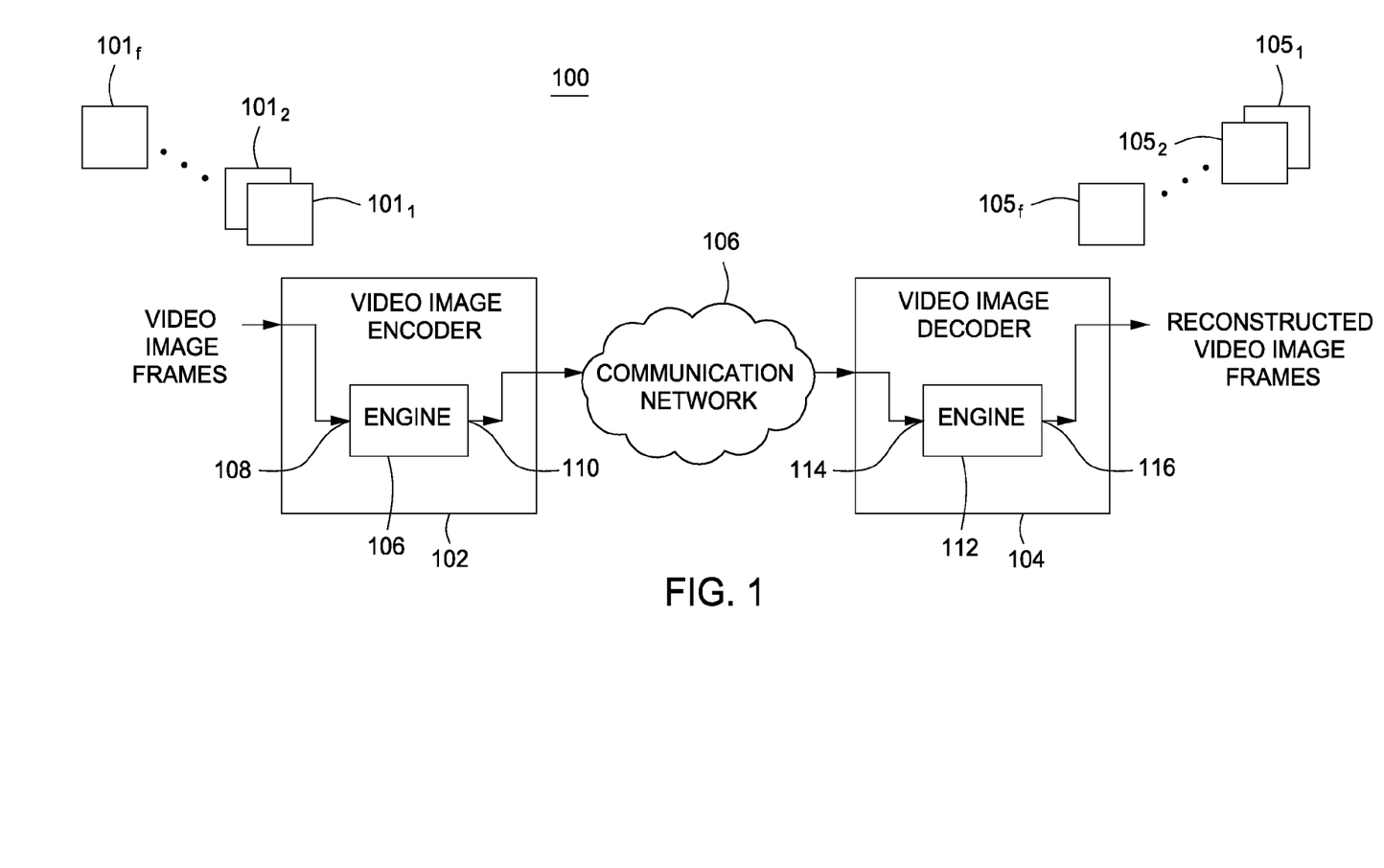
FIG. 1 is a block diagram illustrating an example system for video image transmission.

FIG. 1 is a block diagram illustrating an example system 100 for video image transmission. The system 100 includes an encoder for encoding video images ("video encoder") 102 and a decoder for decoding video images ("video decoder") 104. The video encoder 102 and the video decoder 104 may communicatively couple and exchange (e.g., send and/or receive) communications via network 106.

The network 106 may be a partial or full deployment of most any communication or computer network, including any of a public or private, terrestrial wireless or satellite, or wireline network. As such, the network 106 may include network elements from a Public Switch Telephone Network ("PSTN"), the Internet, core and proprietary public networks, wireless voice and packet-data networks, such as 1G, 2G, 2.5G, 3G and/or 4G telecommunication networks, wireless office telephone systems ("WOTS") and/or wireless local area networks ("WLANs"), including, Bluetooth and/or IEEE 802.11 WLANs, wireless personal area networks ("WPANs"), wireless metropolitan area networks ("WMANs") and the like.

The network elements may include circuit-switched as well as packet-data elements to provide transport of information among any of the video encoder 102 and video decoder 104. The network elements may be configured to communicate such information using any number of protocols and in any manner consistent with exchanging such information. These protocols may include standardized, proprietary, open-source, and freely-available communication protocols for communicating content in circuit-switching and/or packet data networks, and the like.

The video encoder 102 may include a large number of elements; many of which are not shown in FIG. 1 for simplicity of exposition. Details of example architecture of a video encoder, which may be representative of the video encoder 102, are described with reference to FIG. 2.

As shown in FIG. 1, the video encoder 102 includes an engine ("encoder engine") 106 having an input ("encoder-engine input") 108 and an output ("encoder-engine output") 110. The engine 106 or any other portion of the video encoder 102, as described in more detail below, may be formed from one or more programmable and/or hard-coded directives for processing video image frames $101_1, 101_2 \ldots 101_f$ (collectively "video-image frames 101") received via the encoder-engine input 108 into encoded-image content, and for communicating the encoded-image content to the encoder-engine output 110.

Like the video encoder 102, the video decoder 104 may include a large number of elements; many of which are not shown in FIG. 1 for simplicity of exposition. As shown in FIG. 1, the video decoder 104 includes an engine ("decoder engine") 112 having an input ("decoder-engine input") 114 and an output ("decoder-engine output") 116. As described in more detail below, the decode engine 112 or any other portion of the video decoder 104 may be formed from one or more of the programmable and/or hard-coded directives for processing encoded-image content received via the decoder-engine input 114 into one or more reconstructed video image frames ("reconstructed-image frames") $105_1, 105_2 \ldots 105_f$, and for communicating the reconstructed-image frames to the decoder-engine output 116. The reconstructed-image frames $105_1, 105_2 \ldots 105_f$ (collectively "reconstructed-image frames 105") may be visually and/or mathematically identical to, approximations of, similar to, equivalent to and/or other variation of the video-image frames 101 processed into the encoded-image content.

Example System Operation

After obtaining any of the video-image frames 101, the encoder engine 106 may partition such video-image frames 101 into one or more blocks of pixels ("un-encoded blocks"). In turn, the encoder engine 106 may encode (e.g., compress) each of the blocks. To facilitate this, the encoder engine 106 may form, for any of the blocks being encoded, a predicted block. The encoder engine 106 may form this predicted block as described below with respect to FIGS. 3 and 4.

After forming the predicted block, the encoder engine 106 may form a set of residuals as a function of the predicted block and the un-encoded block corresponding to the predicted block ("corresponding un-encoded block"). This may include, for example, the encoder engine 106 calculating a difference between the predicted block and the corresponding un-encoded block. The encoder engine 106 may form the set of residuals in accordance with standards for any of Motion Picture Expert Group ("MPEG") 4 or Advanced Video Coding ("AVC").

The encoder engine 106 may then apply a transform to the set of residuals to obtain one or more transform coefficients for each pixel within the predicted block ("predicted-block-transform coefficients"). Thereafter, the encoder engine 106 may then apply entropy coding to the transform coefficients to generate encoded-image content (e.g., a bit stream representing the predicted block). The encoder engine 106 may output the encoded-image content to the video encoder 102 via the encoder-engine output 110. The video encoder 102, in turn, may transmit the encoded-image content to the video decoder 104 via the network 106.

The video decoder 104 may receive the encoded-image content via the network 106, and pass it to the video-decoder input 114 for processing by the video-decoder engine 112. The video-decoder engine 112 may then decode or otherwise process the encoded-image content into the reconstructed video-image frames 105. The video-decoder engine 112 may then output the reconstructed video-image frames 105 to the video decoder 104 via the decoder-engine output 116. The video decoder 104 may, in turn, output or otherwise provided the reconstructed video-image frames 105 for rendering.

Figure 2:
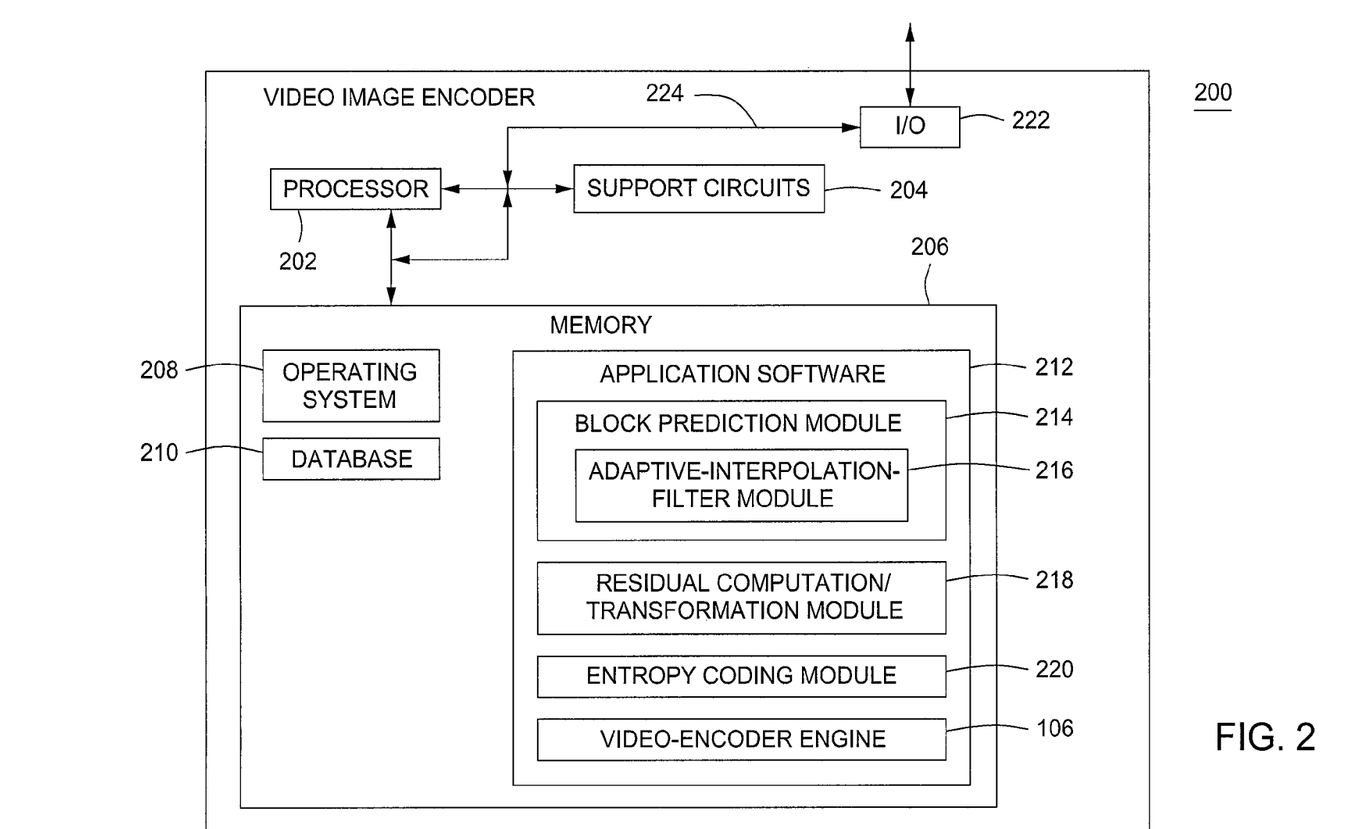
FIG. 2 is a block diagram illustrating an example video image encoder.

Referring now to FIG. 2, a block diagram illustrating an example video encoder 200 is shown. This video encoder 200 may embody the video encoder 102 discussed above. For convenience, the video encoder 200 is described with reference to the system 100 of FIG. 1.

The video encoder 200 may be deployed in one or more general or specialty purpose computers, personal computers, mainframes, minicomputers, server-type computers and/or any processor-based platform that operates on any suitable operating system, such as Microsoft® Windows®, UNIX, Linux and/or Symbian; and that is capable of executing software.

The video encoder 200 may include a large number of elements; many of which are not shown in FIG. 2 for simplicity of exposition. The elements of video encoder 200 may be formed in a single unitary device and concentrated on a single server, client, peer or other type node. Alternatively, the elements of the video encoder 200 may be formed from two or more separate devices, and as such, may be distributed among a number of server, client, peer or other type nodes.

As shown, the video encoder 200 may include one or more processing units (collectively "processor") 202, memory 206, supports circuits 204, input/output ("I/O") interface 222 and bus 224. The processor 202 may be one or more conventional processors, microprocessors, multi-core processors, microcontrollers and the like.

The bus 224 provides for transmissions of digital information among the processor 202, memory 206, support circuits 204, I/O interface 222 and other portions of the video encoder 200 (not shown). The support circuits 204 facilitate operation of the processor 202, and may include well-known circuitry or circuits, including, for example, one or more I/O interfaces; one or more network interface units ("NIUs"); cache; clock circuits; power supplies and the like.

The I/O interface 222 provides an interface to control the transmissions of digital information between components of video encoder 200 (shown and not shown) and between the video decoder 104 and other devices. To facilitate this, the I/O interface 222 may include one or more NIUs for facilitating exchange of information, including the video-image frames 101 and/or the encoded-image content via the network 106. Accordingly, these NIUs may be adapted for communicating in accordance with one or more protocols of wired, wireless, satellite, and/or optical communications, including, for example, Ethernet and SONET protocols. The I/O 222 may be formed, for example, as a memory mapped I/O or a port mapped I/O.

In addition, the I/O interface 222 provides an interface to control the transmissions of digital information between I/O devices (not shown) associated with or otherwise attached to the video encoder 200. The I/O devices (not shown) may be embodied as any of (i) storage devices, including but not limited to, a tape drive, a floppy drive, a hard disk drive or a compact disk drive, (ii) a receiver, (ii) a transmitter, (iii) a speaker, (iv) a display, (v) a speech synthesizer, (vi) an output port, and (vii) a pointing device, such as a mouse, joystick, trackball, touchpad, pointing stick, light pen, head pointer, soap mouse, eye tracking devices, digitizing tablet and stylus, data glove that translates the user's movements to computer gestures; and a key-in device, such as a keyboard or a touchpad, (vii) and the like.

The memory 206 may be or employ any of random access memory, read-only memory, optical storage, magnetic storage, removable storage, erasable programmable read only memory and variations thereof, content addressable memory and variations thereof, flash memory, disk drive storage, removable storage and the like. The memory 206 may store and may be queried by the processor 202 to obtain various software packages to be executed by the processor 202. These software packages may include an operating system 208 and one or more software applications ("application software") 212.

The memory 206 may further store operands, operators, dimensional values, configurations, parameters and other data (collectively "information") that may be used by any of the operating system 208 and application software 212 to control the operation of and/or facilitate performing the functions of the video encoder 200.

The information may include one or more records 210. The records 210 may be arranged as a database or in any other form. The records 210 may include information that the application software 212 may use for forming, as described in more detail below, one or more filters for interpolating one or more of the pixels of the predicted blocks ("interpolative filters"). Alternatively, the records 210 may include one or more predefined interpolative filters, which may be used by the application software 212 as described in more detail below.

The operating system 208 may include code for operating the video encoder 200 and for providing a platform onto which the application software 212 can be executed. The application software 212 may be executed by the processor 202 to control the operation of and/or facilitate performing the functions of the video encoder 200. To facilitate this, the application software 212 may include a number of modules, including the video-encoder engine 106, a block prediction module 214, a residual computation/transformation module 218 and an entropy coding module 220.

The video-encoder engine 106, as noted above, includes directives for encoding the video-image frames 101. These directives, when executed by the processor 202, may interface with one or more of the block prediction module 214, residual computation/transformation module 218 and entropy coding module 220 to facilitate such encoding.

Like the video-encoder engine 106, each of the block prediction module 214, residual computation/transformation module 218 and entropy coding module 220 may include directives for carrying out their functions. For example, the block prediction module 214 may include directives that function to predict each un-encoded block within the video-image frames 101. To facilitate this, the block prediction module 214 includes an adaptive-interpolation-filtering module 216.

The adaptive-interpolation-filtering module 216 includes directives for adaptively selecting one or more filters for interpolative filtering for forming the predicted blocks. This may include directives to (i) form the interpolative filters from the information in the records 210 and/or (ii) select the interpolative filters from the records 210.

The residual computation/transformation module 218 may include directives that function to form the set of residuals, which may include, as noted above, directives for computing a difference between the predicted block and the un-encoded block. The residual computation/transformation module 218 may include directives that function to obtain the predicted-block-transform coefficients. This may include directives for forming the predicted-block-transform coefficients as a function of applying one or more transforms to each pixel of the predicted blocks. The entropy coding module 220 may include directives for applying entropy coding to the predicted-block-transform coefficients to yield the encoded-image content for transmission.

As an alternative to the foregoing architecture, any of the directives of any of the modules in the memory 206 and/or of any other portion of the video encoder 200 may be implemented in any of software, firmware and/or hardware, and executed or otherwise addressed and instructed by the processor 202 to carry out such processing. To facilitate this, the directives together with the processor 202 (and or other portions of the video encoder 200) may be, for example, implemented a special-purpose computer, a field programmable gate array ("FPGA"), an application specific integrated circuit ("ASIC"), a general purpose processor ("GPP"), a system on a chip ("SoC"), and the like.

Although not shown in the Figures, the adaptive-interpolation-filtering module 216 may be employed in the video decoder 104. This way, the encoder 102 need not communicate to the video decoder 104, via the network 106, any indication of the interpolative filters used for forming the encoded-image content.

Example Image Frame

Figure 3:
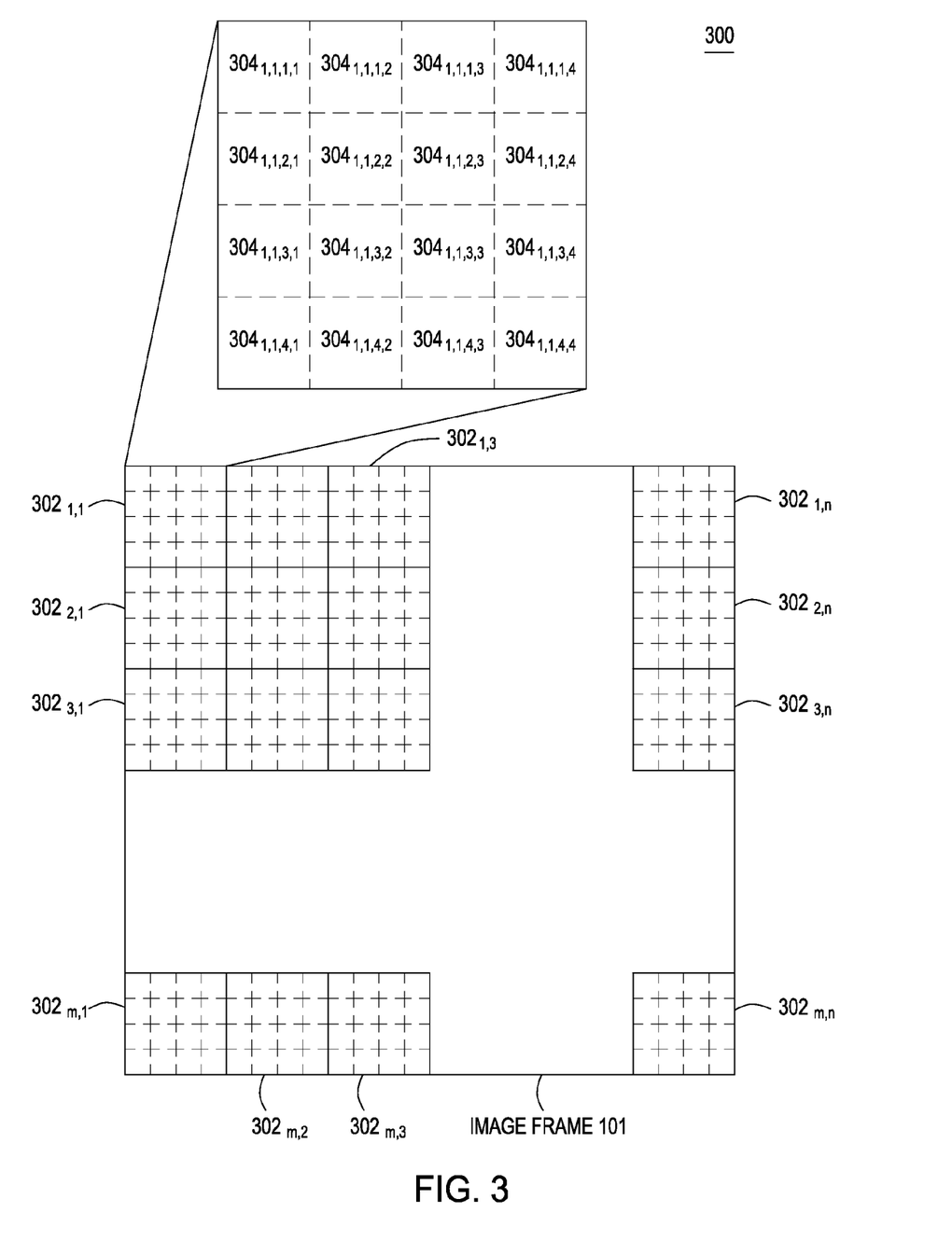
FIG. 3 is a block diagram illustrating an example image frame.

FIG. 3 is a block diagram illustrating an example video-image frame 300. This video-image frame 300 may embody any of the video-image frames 101 discussed above. For convenience, the video-image frame 300 is described with reference to the system 100 of FIG. 1 and the video encoder 200 of FIG. 2.

The video-image frame 300 includes un-encoded blocks $302_{1,1}$, $302_{1,2}$ ... $302_{m,n}$ (collectively "un-encoded blocks 302"). Each of the un-encoded blocks 302 may be defined as a two-dimension array having first and second dimensions. The first and second dimensions may be the same, and as such, the first and second dimensions of the array may be defined as "p"×"p" pixels, where "p"×"p" may be 2×2, 4×4, 8×8, and the like. As shown, the "p"×"p" of each of the un-encoded blocks 302 is 4×4 pixels. This way, the un-encoded block $302_{x,y}$ contains pixels $304_{x,y,1,1}$, $304_{x,y,1,2}$, $304_{x,y,2,1}$, ..., $304_{x,y,4,4}$, (collectively "pixels 304").

To form the predicted block from one of the un-encoded blocks 302 ("selected un-encoded block"), the video-encoder engine 104 selects a set of pixels neighboring the selected un-encoded block ("neighboring-pixel set"). The set of neighboring pixels may include pixels of the video-image frame 300 previously encoded and decoded or otherwise reconstructed ("reconstructed pixels"). To form the predicted block for the un-encoded block $302_{2,2}$, for example, the video-encoder engine 104 may select the neighboring-pixel set from the reconstructed pixels of blocks $302_{2,1}$, $302_{1,1}$, $302_{1,2}$, and $302_{1,3}$.

The video-encoder engine 104 may then determine a measure of activity ("activity measure") associated with the neighboring-pixel set. The activity measure may be a measure or otherwise indicative of, for example, an amount randomness of the neighboring-pixel set. Examples of the activity measure may include a measure of (i) a variance of the neighboring-pixel set, (ii) an amount of noise in the neighboring-pixel set, (iii) a standard deviation of the neighboring-pixel set, (iv) a sum of absolute difference of neighboring-pixel set with an average of the neighboring-pixel set (v) and the like.

Based on the activity measure, the video-encoder engine 104 may select and/or apply one or more of the interpolation filters to one or more of the reconstructed pixels of the neighboring-pixel set to obtain a prediction for each of the pixels $304_{x,y,2,2}$ of the un-encoded block $302_{2,2}$. This, in turn, yields the predicted block of the un-encoded block $302_{2,2}$.

The video-encoder engine 104 may select and/or apply the same neighboring-pixel set to the pixels $304_{x,y,2,2}$ of the un-encoded block $302_{2,2}$. Alternatively, video-encoder engine 104 may select and/or apply more than one neighboring-pixel set to the pixels $304_{x,y,2,2}$ of the un-encoded block $302_{2,2}$.

In addition to the activity measure, video-encoder engine 104 may determine a measure of distance between one or more of the pixels $304_{2,2,x,y}$ of the un-encoded block $302_{2,2}$ and the pixels 304 of the neighboring-pixel set ("distance measure"). Based on the distance measure, the video-encoder engine 104 may select and/or apply one or more of the interpolation filters to one or more of the reconstructed pixels of the neighboring-pixel set to obtain a prediction for each of the pixels $304_{2,2,x,y}$ of the un-encoded block $302_{2,2}$. This, in turn, yields the predicted block of the un-encoded block $302_{2,2}$.

Example Operation

Figure 4:
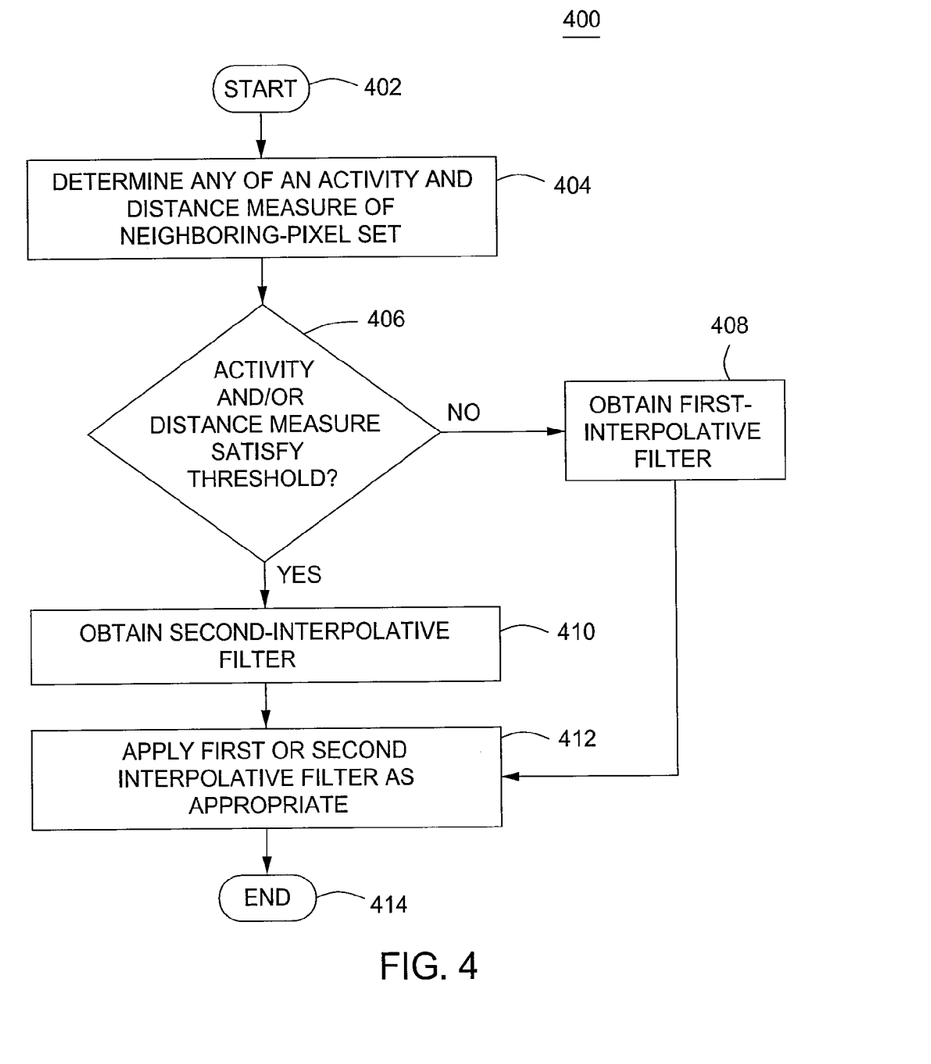
FIG. 4 s a flow diagram illustrating an example flow for carrying out an adaptive interpolative filtering of an un-encoded block of a video-image frame.

FIG. 4 is a flow diagram illustrating an example flow 400 for carrying out an adaptive interpolative filtering of an un-encoded block of a video-image frame, such as the video-image frame 300. For convenience, the flow 400 is described with reference to the system 100 of FIG. 1, the video encoder 200 of FIG. 2 and the video-image frame 300 of FIG. 3.

The flow 400 starts at termination block 402, and sometime thereafter transitions to process block 404. At process block 404, the video-encoder engine 104 may determine any of the activity measure and distance measure for the neighboring-pixel set of the un-encoded block $302_{2,2}$. To facilitate this, the video-encoder engine 104, via the adaptive filtering module 216, may select the neighboring-pixel set in accordance with any of one or more filter modes defined in the AVC standard or other selection criteria.

The adaptive filtering module 216 may determine the activity measure by, for example, calculating or otherwise determining a variance of the neighboring-pixel set of the un-encoded block $302_{2,2}$. Alternatively, the adaptive filtering module 216 may determine the activity measure by calculating or otherwise determining any of a standard deviation of the neighboring-pixel set of the un-encoded block $302_{2,2}$, a sum of absolute difference of the neighboring-pixel set of the un-encoded block $302_{2,2}$ with the average of the neighboring-pixel set of the un-encoded block $302_{2,2}$ and other like-type measures of variability of the pixels of the neighboring-pixel set of the un-encoded block $302_{2,2}$. After process block 404, the flow 400 may transition to decision block 406.

At decision block 406, the video-encoder engine 104, via the adaptive filtering module 216, makes a determination as to whether the activity and/or distance measure satisfies a given threshold. When the video-encoder engine 104, via the adaptive filtering module 216, determines that the activity and/or distance measure satisfies the threshold, the flow 400 may transition to process block 410. When the video-encoder engine 104, via the adaptive filtering module 216, determines that the activity and/or distance measure does not satisfy the threshold, the flow 400 may transition to process block 408.

At process block 408, the video-encoder engine 104, via the adaptive filtering module 216, obtains a first interpolative filter. The adaptive filtering module 216 may obtain the first interpolative filter as a function of the records 210. This may include the adaptive filtering module 216 (i) forming the first interpolative filter from the information in the records 210 for forming the interpolative filters, and/or (ii) selecting the first interpolative filter from the predefined interpolative filters in the record 210. The adaptive filtering module 216 may, for example, form the first interpolative filter by selecting from the records 210 a filter type, and then selecting from the records 210 one or more coefficients for such filter type. After process block 408, the flow 400 may transition to process block 412, as described in more detail below.

At process block 410, the video-encoder engine 104, via the adaptive filtering module 216, obtains a second interpolative filter. This second interpolative filter is typically more or, alternately, less restrictive than the first interpolative filter.

Like above, the adaptive filtering module 216 may obtain the second interpolative filter as a function of the records 210. This may include the adaptive filtering module 216 (i) forming the second interpolative filter from the information in the records 210 for forming the interpolative filters, and/or (ii) selecting the second interpolative filter from the predefined interpolative filters in the record 210. The adaptive filtering module 216 may, for example, form the second interpolative filter by selecting from the records 210 a second filter type, and then selecting from the records 210 one or more coefficients for such second filter type. After process block 410, the flow 400 may transition to process block 412.

At process block 412, the video-encoder engine 104, via the adaptive filtering module 216, applies the first or second interpolative filter, as appropriate, to one or more of the reconstructed pixels of the neighboring-pixel set to obtain a prediction for each of the pixels $304_{x,y,2,2}$ of the un-encoded block $302_{2,2}$, and yield the predicted block for the un-encoded block $302_{2,2}$. After process block 412, the flow 400 may transition to termination block 414.

At termination block 414, the flow 400 may end. Alternatively, the flow 400 may be repeated periodically, in continuous fashion, or upon being triggered as a result of a condition, such as an impetus for forming one or more predicted blocks for some or all of the remaining un-encoded blocks 302.

Although not shown, the video-encoder engine 104, via the adaptive filtering module 216, may make the determination at decision block 406 so that when the activity and/or distance measure is less than (or less than and equal to) the given threshold, the flow 400 may transition to process block 408. Alternatively, the video-encoder engine 104, via the adaptive filtering module 216, may make the determination at decision block 406 so that when the activity and/or distance measure is greater than (or greater than and equal to) the given threshold, the flow 400 may transition to process block 408.

As an alternative, the given threshold may define first and second thresholds. This way, the video-encoder engine 104, via the adaptive filtering module 216, may make the determination at decision block 406 so that when the activity and/or distance measure is between the first and second thresholds (or greater than and equal to the first threshold and less than and equal to the second threshold), the flow 400 may transition to process block 408. And when the video-encoder engine 104, via the adaptive filtering module 216, may make the determination that the activity and/or distance measure is less than (or equal to) the first threshold or greater than (or equal to) the second threshold, the flow 400 may transition to process block 410.

The flow 400 may include additional decision blocks in which the video-encoder engine 104, via the adaptive filtering module 216, may (i) make one or more additional determinations as to whether any of the activity and/or distance measure satisfies additional thresholds, and (ii) obtain additional interpolative filters responsive to such determinations. As there is no upper bound on the number of interpolative filters that are possible to select, those skilled in the art may design desired multiple thresholds, resulting in multiple permutations and combinations for selecting the filters according to the desired thresholds.

Conclusion

Variations of the method, apparatus and system described above are possible without departing from the scope of the invention. In view of the wide variety of embodiments that can be applied, it should be understood that the illustrated embodiments are exemplary only, and should not be taken as limiting the scope of the following claims. For instance, the exemplary embodiments described herein, may be embodied as methods, apparatus, electronic devices, and/or computer program products. Accordingly, such embodiments may be embodied in hardware and/or in software (including firmware, resident software, micro-code, etc.), which may be generally referred to herein as a "circuit" or "module".

Other exemplary embodiments may take forms of computer program products disposed on a computer-usable or computer-readable storage medium having computer-usable or computer-readable program code or instructions (collectively "code") embodied in the medium for use by or in connection with an instruction execution system. As used herein, the computer-usable or computer-readable medium may be any medium that can contain, store, communicate, propagate, or transport the code for use by or in connection with the instruction execution system, apparatus, or device. This code may also be stored in a computer-usable or computer-readable memory that may direct a computer or other programmable data processing apparatus to function in a particular manner, such that the code stored thereon produce an article of manufacture including code that implements the function specified in the foregoing flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

The code for carrying out operations of the present invention may be written in an object oriented programming language, such as Java®, Smalltalk or C++, and the like. However, the code for carrying out operations or functions may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

And although not specifically stated above, the network 106 may be integral to or integrated with other private and public satellite, terrestrial wireless, and wireline networks to provide a wide-ranging coverage area. Furthermore, it is recognized that differences between private and public networks, and differences between circuit-switched and packet-data data networks may only be a matter of semantics due to convergence between telecommunication and computing technologies.

In addition, the network 106 may include a few or, alternatively, many network elements, none of which are shown. Using sophisticated and/or simple routing schemas, the network 106 may provide connectivity between the elements of the HA-computing system 100 using few or many of its network elements. The network 106 may be configured in accordance with any number of communication and/or security protocols.

In accordance with above, these communication protocols may include any of 1G, 2G, 2.5G, 3G and 4G telecommunication protocol, which may include any the commonly used protocols, such as Advanced Mobile Phone Service ("AMPS"), Time Division Multiple Access ("TDMA"), Global System for Mobile Communications ("GSM"), and Code Division Multiple Access ("CDMA"), Universal Mobile Telecommunications Service ("UMTS"), Wide-band CDMA ("WCDMA"), ultra wideband CMDA, CDMA2000, Generic Packet Radio Services ("GPRS"), Telecommunications Industry Association's ("TIA") IS-94 specifications, and any combination or variation thereof.

The communication protocols may also include any WLAN, WMAN, and/or PAN protocols, which may include any of the commonly used protocols, such as the Institute of Electrical and Electronic Engineers ("IEEE") 802.11 et seq.; IEEE 802.16 protocol, the IEEE 802.15 protocol, the ZigBee specification, the Bluetooth Specification, the WOTS specification, the HiperLAN specification, the HomeRF specification and/or any other wireless-networking protocol that promulgates rules to use licensed and/or freely-available, unlicensed spectrum, which in the United States includes the Industrial, Scientific, and Medical ("ISM") bands.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the described methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It should be understood that the exemplary embodiments are not limited to the above-mentioned memories and that other platforms and memories may support the described methods.

It will be apparent to one of ordinary skill in the art that aspects of the invention, as described above, may be implemented in many different forms of software, firmware, and hardware in the implementations illustrated in the figures. Any actual software code or specialized control hardware used to implement aspects consistent with the present invention is not limiting of the present invention. Thus, the operation and behavior of the aspects were described without reference to the specific software code or hardware logic. It should be understood that a person of ordinary skill in the art would be able to design software and control hardware to implement the aspects of the present invention based on the description herein.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items.

Exemplary embodiments have been illustrated and described. Further, the claims should not be read as limited to the described order or elements unless stated to that effect. In addition, use of the term "means" in any claim is intended to invoke 35 U.S.C. §112, ¶6, and any claim without the word "means" is not so intended.

We claim:

1. A method comprising:
    selecting one or more neighboring pixels sets, neighboring an un-encoded block of pixels in an image undergoing intraframe prediction;
    determining an activity measure associated with the neighboring sets of pixel sets and their corresponding variability;
    selecting interpolation filters for filtering at least a portion of the one or more neighboring sets of pixel sets in accordance with the activity measure wherein each additional interpolation filter is selected if the activity measure for a previous filter does not satisfy a threshold from a plurality of thresholds; and
    applying the selected interpolation filters to the one or more neighboring pixel sets to obtain a prediction block corresponding to the un-encoded block of pixels.

2. The method of claim 1, wherein selecting the interpolation filters comprises selecting, in accordance with the activity measure, at least one coefficient of the filter.

3. The method of claim 1, further comprising:
    determining a distance measure between at least one pixel in the neighboring pixel sets and the un-encoded block of pixels; and
    selecting the one or more interpolation filters in accordance with the distance measure.

4. The method of claim 3, wherein determining the activity measure comprises:
    calculating a variance of the neighboring pixel sets;
    calculating an amount of noise in the neighboring pixel sets;
    calculating a standard deviation of the neighboring pixel sets; and
    calculating a sum of absolute difference of the neighboring pixel sets with the average of the neighboring pixel sets.

5. The method of claim 1, wherein the interpolation filters are selected from a set of predefined filters, and wherein at least one predefined filter of the predefined filters operates to filter the at least a portion of the neighboring pixel sets of pixels in accordance with the activity measure or the distance.

6. The method of claim 1, further comprising: filtering the at least a portion of the neighboring pixel sets of pixels using the interpolation filters.

7. An apparatus for selecting a filter for intraframe prediction, the apparatus comprising: a processor executing an adaptive filtering module wherein the filtering module:
    selects one or more neighboring pixels sets, neighboring an un-encoded block of pixels in an image undergoing intraframe prediction;
    determines an activity measure associated with the neighboring sets of pixel sets and their corresponding variability;
    selects interpolation filters for filtering at least a portion of the one or more neighboring pixel sets in accordance with the activity measure wherein each additional interpolation filter is selected if the activity measure for a previous filter does not satisfy a threshold from a plurality of thresholds; and
    applies the interpolation filters to the one or more neighboring pixel sets to obtain a prediction block corresponding to the un-encoded block of pixels.

8. The apparatus of claim 7, wherein the adaptive filtering module:
    determines a distance measure between at least one pixel in the neighboring pixel sets of pixels and the pixel undergoing intraframe prediction; and
    selects the interpolation filters for filtering at least a portion of the neighboring pixel sets in accordance with the at least one of the activity measure.

9. The apparatus of claim 8, wherein at least one coefficient of the interpolation filters is selected in accordance with the at least one of the activity measure or the distance measure.

10. The apparatus of claim 8, wherein the neighboring pixel sets comprises: at least one pixel reconstructed at a time prior to determining the at least one of the activity measure or the distance measure.

11. The apparatus of claim 8, wherein the activity measure comprises:
a variance of the neighboring pixel sets;
an amount of noise in the neighboring pixel sets;
a standard deviation of the neighboring pixel sets; and
a sum of absolute difference of the neighboring pixel sets with the average of the neighboring pixel sets.

12. The apparatus of claim 8, wherein the interpolation filters is selected from a set of predefined filters, and wherein at least one predefined filter of the set of predefined filters operates to filter the at least a portion of the neighboring pixel sets of pixels in accordance with the at least one of the activity measure or the distance measure.

13. A non-transitory computer-readable medium having stored thereon a plurality of instructions, the plurality of instructions including instructions which, when executed by a processor, cause the processor to:
selects one or more neighboring pixel sets, neighboring an un-encoded block of pixels in an image undergoing intraframe prediction;
determine an activity measure associated with the neighboring pixel sets and their corresponding variability;
select one or more interpolation filters for filtering at least a portion of the one or more neighboring pixel sets in accordance with the activity measure wherein each additional interpolation filter is selected if the activity measure for a previous filter does not satisfy a threshold from a plurality of thresholds;
applies the selected one or more interpolation filters to the one or more neighboring pixels sets to obtain a prediction block corresponding to the un-encoded block of pixels.

14. A non-transitory computer-readable medium having stored thereon a plurality of instructions, the plurality of instructions including instructions which, when executed by a processor, cause the processor to:
selects one or more neighboring pixel sets, neighboring an un-encoded block of pixels in an image undergoing intraframe prediction;
determine an activity measure associated with the neighboring a pixel sets and their corresponding variability;
select interpolation filters for filtering at least a portion of the one or more neighboring pixel sets in accordance with the at least one of the activity measure wherein each additional interpolation filter is selected if the activity measure for a previous filter does not satisfy a threshold from a plurality of thresholds; and
applies the selected interpolation filters to the one or more neighboring pixels sets to obtain a prediction block corresponding to for each pixel of the un-encoded block of pixels.

15. The computer-readable medium of claim 13, wherein the neighboring pixel sets comprises: at least one pixel reconstructed at a time prior to determining the activity measure.

16. The computer-readable medium of claim 13, wherein determining the activity measure comprises:
calculating a variance of the neighboring pixel sets;
calculating an amount of noise in the neighboring pixel sets;
calculating a standard deviation of the neighboring pixel sets; and
calculating a sum of absolute difference of the neighboring pixel sets with the average of the neighboring pixel sets.

17. The computer-readable medium of claim 13, wherein the interpolation filters is selected from a set of predefined filters, and wherein at least one predefined filter of the set of predefined filters operates to filter the at least a portion of the neighboring pixel sets in accordance with the activity measure.

18. A system comprising:
a memory receiving and storing requests to obtain programmable instructions comprising:
selecting one or more neighboring pixels sets, neighboring an un-encoded block of pixels in an image undergoing intraframe prediction;
determining an activity measure associated with the neighboring pixel sets and their corresponding variability;
selecting interpolation filters for filtering at least a portion of the one or more neighboring sets of pixels in accordance with the activity measure wherein each additional interpolation filter is selected if the activity measure for a previous filter does not satisfy a threshold from a plurality of thresholds;
applying the selected interpolation filters to the one or more neighboring pixels sets to obtain a prediction block corresponding to the un-encoded block of pixels; and
a processor which obtains the programmable instructions from the memory and executes the programmable instructions.

19. The system of claim 18, wherein the memory stores at least one coefficient of the interpolation filters for selection in accordance with the activity measure.

20. The system of claim 18, wherein the neighboring pixel sets comprises: at least one pixel reconstructed at a time prior to determining the activity measure.

* * * * *